United States Patent
Gao et al.

(10) Patent No.: US 11,550,153 B2
(45) Date of Patent: Jan. 10, 2023

(54) OPTICAL COMBINER ABERRATION CORRECTION IN EYE-TRACKING IMAGING

(71) Applicant: Meta Platforms Technologies, LLC, Menlo Park, CA (US)

(72) Inventors: Weichuan Gao, Redmond, WA (US); Chadwick Brian Martin, Kirkland, WA (US); Robin Sharma, Redmond, WA (US); Byron Taylor, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 187 days.

(21) Appl. No.: 16/854,613

(22) Filed: Apr. 21, 2020

(65) Prior Publication Data

US 2021/0325677 A1   Oct. 21, 2021

(51) Int. Cl.
  *G02B 27/01*  (2006.01)
  *G02B 3/02*   (2006.01)
  *G06F 3/01*   (2006.01)

(52) U.S. Cl.
  CPC ........... *G02B 27/0172* (2013.01); *G02B 3/02* (2013.01); *G02B 27/0179* (2013.01); *G06F 3/013* (2013.01); *G02B 2027/011* (2013.01); *G02B 2027/014* (2013.01); *G02B 2027/0187* (2013.01)

(58) Field of Classification Search
  None
  See application file for complete search history.

(56) References Cited

U.S. PATENT DOCUMENTS

| 2009/0213352 | A1* | 8/2009 | Goehnermeier | G03F 7/70891 |
| | | | | 355/67 |
| 2016/0270656 | A1* | 9/2016 | Samec | A61B 3/0025 |
| 2019/0019023 | A1* | 1/2019 | Konttori | G06V 10/141 |
| 2019/0067354 | A1* | 2/2019 | Cheng | H01L 27/14685 |
| 2019/0236355 | A1* | 8/2019 | Ollila | A61B 3/113 |
| 2020/0051320 | A1  | 2/2020 | Laffont et al. | |

OTHER PUBLICATIONS

International Searching Authority, Patent Cooperation Treaty, European Application No. PCT/US2021/024209, Notification dated Jun. 24, 2021, 3 pages.
International Searching Authority, Patent Cooperation Treaty, Written Opinion of the International Searching Authority, European Application No. PCT/US2021/024209, Notification dated Jun. 24, 2021, 5 pages.

* cited by examiner

*Primary Examiner* — Jwalant Amin
(74) *Attorney, Agent, or Firm* — Freestone Intellectual Property Law PLLC; Aaron J. Visbeek

(57) ABSTRACT

An optical assembly for an eye-tracking camera includes an aperture stop, a first optical surface, and a second optical surface. The optical assembly is configured to receive non-visible light reflected or scattered by an eye and to direct the non-visible light to an image sensor along an optical path, where the non-visible light is received from an optical combiner of an eye-tracking system. The first optical surface is disposed on the optical path and is configured to correct for field-independent optical aberrations induced by the optical combiner. The second optical surface is disposed on the optical path and is configured to correct for field-dependent optical aberrations induced by the optical combiner.

20 Claims, 7 Drawing Sheets

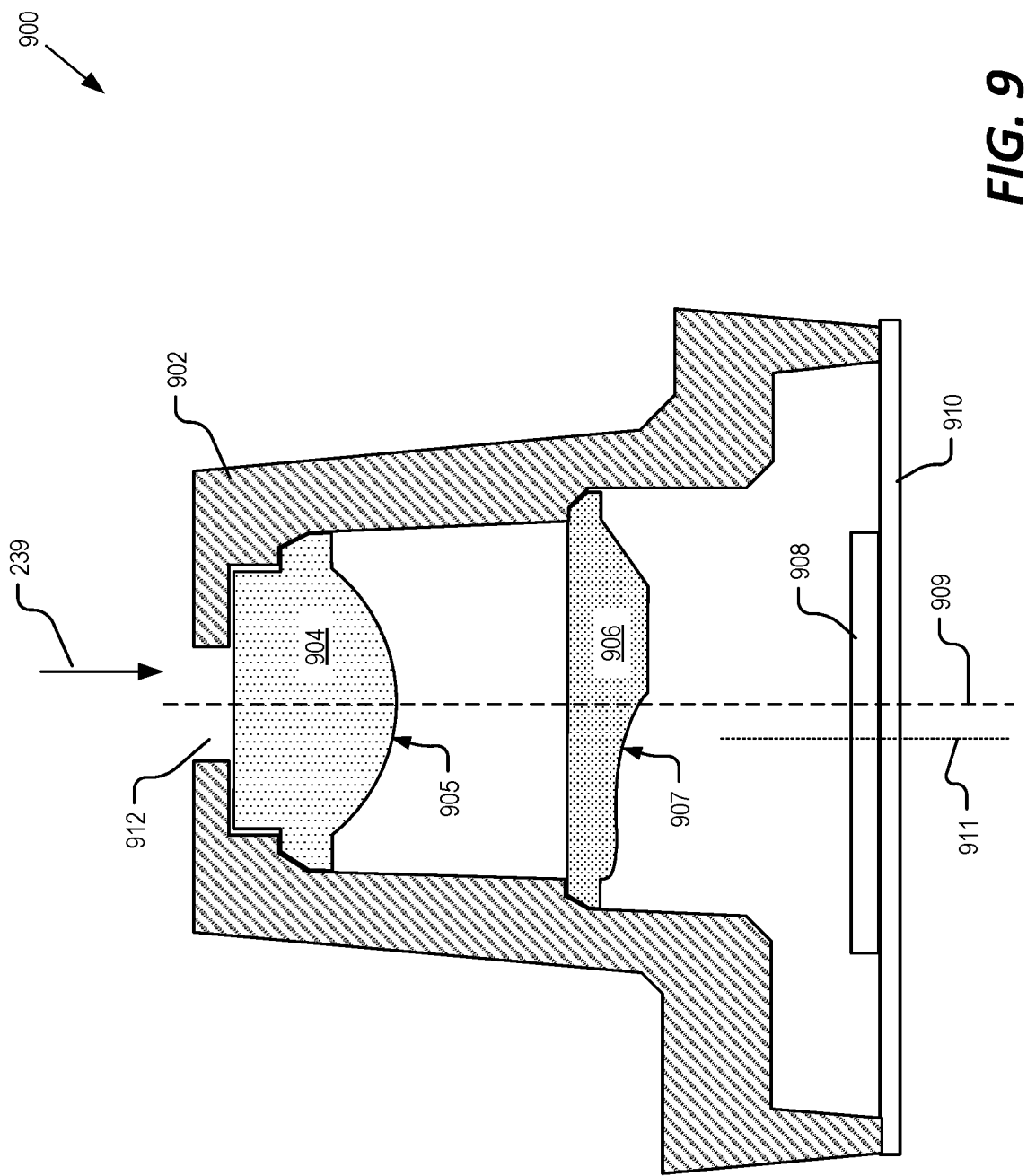

OPTICAL COMBINER ABERRATION CORRECTION IN EYE-TRACKING IMAGING

BACKGROUND INFORMATION

A smart device is an electronic device that typically communicates with other devices or networks. In some situations the smart device may be configured to operate interactively with a user. A smart device may be designed to support a variety of form factors, such as a head mounted device, a head mounted display (HMD), or a smart display, just to name a few.

Smart devices may include one or more electronic components for use in a variety of applications, such as gaming, aviation, engineering, medicine, entertainment, video/audio chat, activity tracking, and so on. In some examples, a smart device may perform eye-tracking which may enhance the user's viewing experience. Eye-tracking may be aided, in some cases, by illuminating the eye of the user. Thus, some smart devices may incorporate an eye-tracking system that includes an illumination source as well as a camera for tracking movements of the user's eye. However, various contexts may generate challenges to capturing images of the eye that are sufficient for analysis. In particular, various optical elements included in the eye-tracking system may induce optical aberrations that distort the captured images.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 9 illustrates an example eye-tracking camera, in accordance with aspects of the present disclosure.

DETAILED DESCRIPTION

Figure 1:
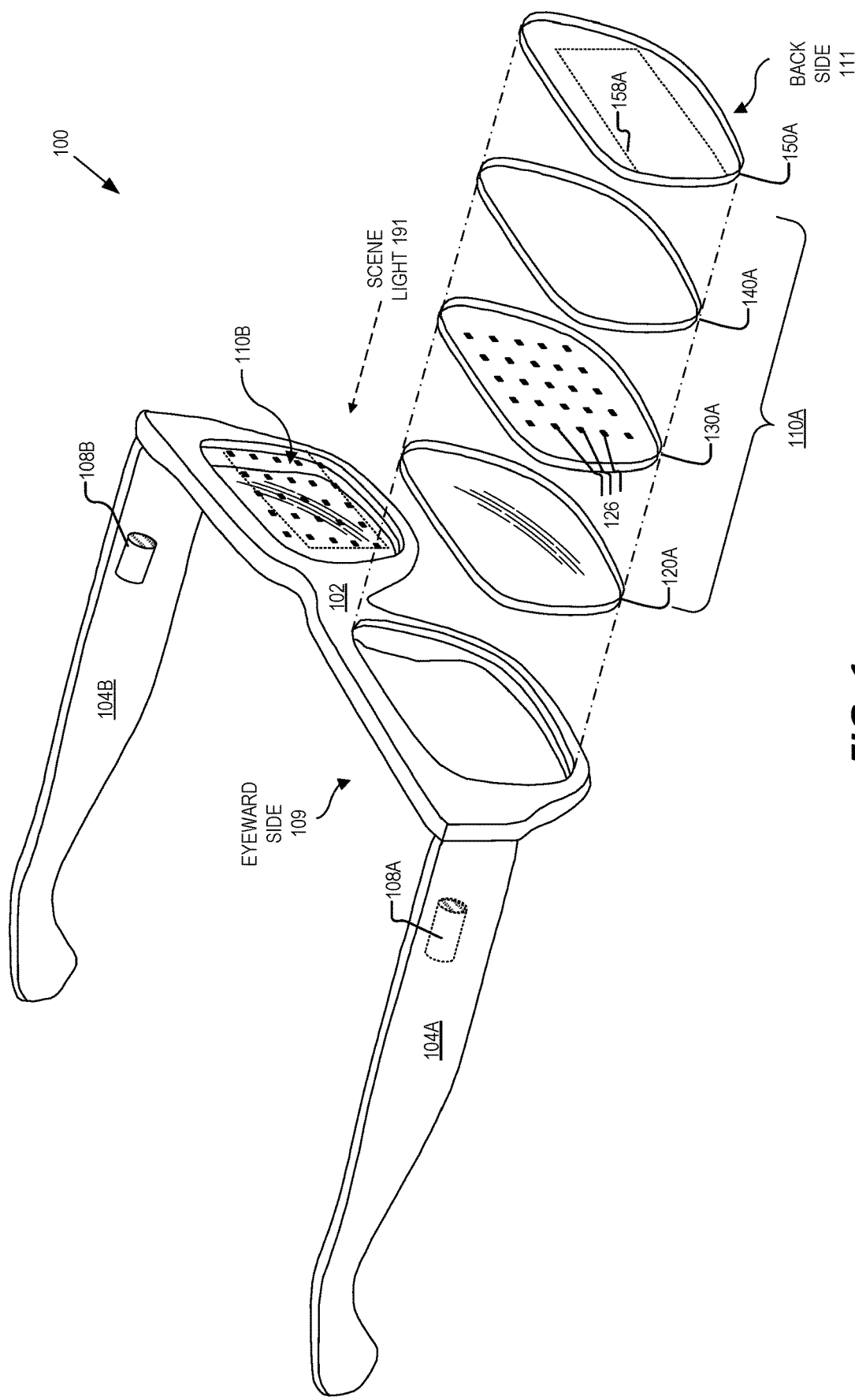
FIG. 1 illustrates an example head mounted device, in accordance with aspects of the present disclosure.

Embodiments of an optical assembly, an eye-tracking camera, an eye-tracking system, and a smart device that include optical combiner aberration correction in eye-tracking imaging are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 μm.

An eye-tracking system may include illuminating the eye with non-visible light, where non-visible light that is reflected or scattered by the eye is received by one or more optical combiners. The optical combiners may be configured to then direct the non-visible light to the eye-tracking camera for imaging. In various embodiments, the optical combiner may include a diffractive optical element (DOE) (e.g., uniform grating, Bragg grating, blazed grating, volume hologram, etc.). In operation, the optical combiner may be configured to diffract (in reflection) a particular wavelength and/or polarization of incident light while passing light of other wavelengths/polarizations. For example, the optical combiner may be configured to diffract the reflected non-visible light, received from the eye, towards the eye-tracking camera, while allowing visible light to pass through. In some examples, the optical combiner is one layer of a stack of surfaces that may include a coating that blocks the non-visible light from the world side from entering into the system. The eye-tracking camera, itself, may include a bandpass filter to pass the non-visible light to an image sensor while blocking/rejecting unwanted light from angles/wavelengths.

As mentioned above, the optical combiner directs the non-visible light to the eye-tracking camera for imaging of the eye. However, the optical combiner may induce optical aberrations when diffracting the non-visible light.

One type of optical aberration induced by the optical combiner may include field-independent optical aberrations, such as uniform astigmatic aberrations. In some examples, the field-independent optical aberrations are substantially uniform across a field-of-view of the eye-tracking camera. Another type of optical aberration induced by the optical combiner may include field-dependent optical aberrations, such as non-uniform astigmatic aberrations. Such field-dependent optical aberrations may be induced by the optical combiner as a result of the diffraction effect changing dependent on the angle at which light is incident on the optical combiner. Thus, the diffraction effect at one field point within the field-of-view may be different from the diffraction effect at another point within the field. Both the field-independent and the field-dependent optical aberrations may distort the images captured by the eye-tracking camera, complicating, if not, preventing, analysis of the images for eye-tracking operations.

Accordingly, aspects of the present disclosure include incorporating multiple optical surfaces into an optical assembly of an eye-tracking camera to correct for the optical aberrations induced by the optical combiner for imaging the eye. The optical assembly may include a first optical surface that is disposed on an optical path proximate to an aperture stop to correct for the field-independent optical aberrations (e.g., uniform astigmatism) that are induced by the optical combiner. The optical assembly may also include a second optical surface that is disposed on the optical path to correct for the field-dependent optical aberrations (e.g., non-uniform astigmatism) that are also induced by the optical combiner. In one embodiment, the first and second optical surfaces are provided by way of respective first and second lenses. In another embodiment, the first and second optical surfaces are provided by a single monolithic prism that reflects the non-visible light to the image sensor. These and other aspects will be described in more detail below.

FIG. 1 illustrates an example head-mounted device 100, in accordance with aspects of the present disclosure. A head-mounted device, such as head-mounted device 100, is one type of smart device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

The illustrated example of head-mounted device 100 is shown as including a frame 102, temple arms 104A and 104B, and near-eye optical elements 110A and 110B. Eye-tracking cameras 108A and 108B are shown as coupled to temple arms 104A and 104B, respectively. FIG. 1 also illustrates an exploded view of an example of near-eye optical element 110A. Near-eye optical element 110A is shown as including an optically transparent layer 120A, an illumination layer 130A, an optical combiner layer 140A, and a display layer 150A. Illumination layer 130A is shown as including a plurality of in-field light sources 126. The in-field light source 126 may be configured to emit non-visible light for eye-tracking purposes, for example. Although FIG. 1 illustrates head-mounted device 100 as including in-field light sources 126 disposed within the field-of-view, in other examples, head-mounted device 100 may alternatively include light sources disposed outside the field-of-view, such around a periphery of the near-eye optical element 110A (e.g., incorporated within or near the rim of frame 102). In some examples, the illumination layer 130A includes a blocking layer to block/prevent non-visible light received from the backside 111. Display layer 150A may include a waveguide 158A that is configured to direct virtual images to an eye of a user of head-mounted device 100.

As shown in FIG. 1, frame 102 is coupled to temple arms 104A and 104B for securing the head-mounted device 100 to the head of a user. Example head-mounted device 100 may also include supporting hardware incorporated into the frame 102 and/or temple arms 104A and 104B. The hardware of head-mounted device 100 may include any of processing logic, wired and/or wireless data interfaces for sending and receiving data, graphic processors, and one or more memories for storing data and computer-executable instructions. In one example, head-mounted device 100 may be configured to receive wired power and/or may be configured to be powered by one or more batteries. In addition, head-mounted device 100 may be configured to receive wired and/or wireless data including video data.

FIG. 1 illustrates near-eye optical elements 110A and 110B that are configured to be mounted to the frame 102. In some examples, near-eye optical elements 110A and 110B may appear transparent to the user to facilitate augmented reality or mixed reality such that the user can view visible scene light 191 from the environment while also receiving display light directed to their eye(s) by way of display layer 150A. In further examples, some or all of the near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, a micro-LED display, etc.) incorporated in the virtual reality headset.

As shown in FIG. 1, illumination layer 130A includes a plurality of in-field light sources 126. Each in-field light source 126 may be disposed on a transparent substrate and may be configured to emit non-visible light towards an eyeward side 109 of the near-eye optical element 110A. In some aspects of the disclosure, the in-field light sources 126 are configured to emit near infrared light (e.g. 700 nm-1.4 μm). Each in-field light source 126 may be a micro light emitting diode (micro-LED), an edge emitting LED, a vertical cavity surface emitting laser (VCSEL) diode, or a Superluminescent diode (SLED). In other embodiments, each in-field light source 126 may be an exit feature of a waveguide, included in illumination layer 130A, where the waveguide is configured to direct non-visible light emitted from a VCSEL diode or other light source incorporated into the rim of frame 102 to the exit feature for illuminating the eye of the user.

As mentioned above, in some examples the head-mounted device 100 may provide light sources disposed around a rim/periphery of a lens. However, placing light sources within the field of view of the eye may be advantageous for computation of specular or "glint" reflections that can be imaged by a camera such as eye-tracking camera 108A that is positioned to image the eye of a wearer of head-mounted device 100.

While in-field light sources 126 may introduce minor occlusions into the near-eye optical element 110A, the in-field light sources 126, as well as their corresponding routing may be so small as to be unnoticeable or insignificant to a wearer of head-mounted device 100. Additionally, any occlusion from in-field light sources 126 will be placed so close to the eye as to be imperceptible by the human eye and therefore assist in the in-field light sources 126 being not noticeable or insignificant. In some embodiments, each in-field light source 126 has a footprint (or size) that is less than about 200×200 microns.

As mentioned above, the in-field light sources 126 of the illumination layer 130A may be configured to emit non-visible light towards the eyeward side 109 of the near-eye optical element 110A to illuminate the eye of a user. The near-eye optical element 110A is shown as including optical combiner layer 140A disposed between the illumination layer 130A and a backside 111 of the near-eye optical element 110A. In some aspects, the optical combiner layer 140A is configured to receive reflected non-visible light that is reflected by the eye of the user and to direct the reflected non-visible light towards the eye-tracking camera 108A. In examples where the in-field light sources 126 emit infrared light, the eye-tracking camera 108A may be an infrared camera configured to image the eye of the user based on the received reflected infrared light. In some aspects, the optical combiner layer 140A is transmissive to visible light, such as scene light 191 incident on the backside 111 of the near-eye optical element 110A. In some examples, the optical combiner layer 140A may be configured as a volume hologram and/or may include one or more diffraction gratings (e.g., Bragg, blazed, uniform, etc.) for directing the reflected non-visible light towards the eye-tracking camera 108A. In some examples, the optical combiner layer 140A includes a polarization-selective hologram (a.k.a. polarized volume hologram) that diffracts a particular polarization orientation of incident light while passing other polarization orientations. In other examples, the optical combiner layer 140A includes one or more Fresnel optical elements that are configured to direct the reflected non-visible light to the camera while also allowing visible light to propagate through the near-eye optical element 110A. By way of example a Fresnel optical element, included in the optical combiner layer 140A, may include active surfaces that are selectively coated with a "hot mirror" layer (reflecting non-visible light and passing visible light) to direct non-visible light to a camera while also passing visible light for viewing by the wearer of the head-mounted device 100.

Display layer 150A may include one or more other optical elements depending on the design of the head-mounted device 100. For example, the display layer 150A may include a waveguide 158A to direct display light generated by an electronic display to the eye of the user. In some implementations, at least a portion of the electronic display is included in the frame 102 of the head-mounted device 100. The electronic display may include an LCD, an organic light emitting diode (OLED) display, micro-LED display, pico-projector, or liquid crystal on silicon (LCOS) display for generating the display light.

Optically transparent layer 120A is shown as being disposed between the illumination layer 130A and the eyeward side 109 of the near-eye optical element 110A. The optically transparent layer 120A may receive the non-visible light emitted by the illumination layer 130A and pass the non-visible illumination light to illuminate the eye of the user. As mentioned above, the optically transparent layer 120A may also be transparent to visible light, such as scene light 191 received from the environment and/or display light received from the display layer 150A. In some examples, the optically transparent layer 120A has a curvature for focusing light (e.g., display light and/or scene light) to the eye of the user. Thus, the optically transparent layer 120A may, in some examples, be referred to as a lens. In some aspects, the optically transparent layer 120A has a thickness and/or curvature that corresponds to the specifications of a user. In other words, the optically transparent layer 120A may be a prescription lens. However, in other examples, the optically transparent layer 120A may be a non-prescription lens. In some examples, the back side 111 of the optically transparent layer 120A may have optical power, where eyeward side 109 of the optically transparent layer 120A may include a curved surface for cancelling out the power induced by the back side surface.

Figure 2:
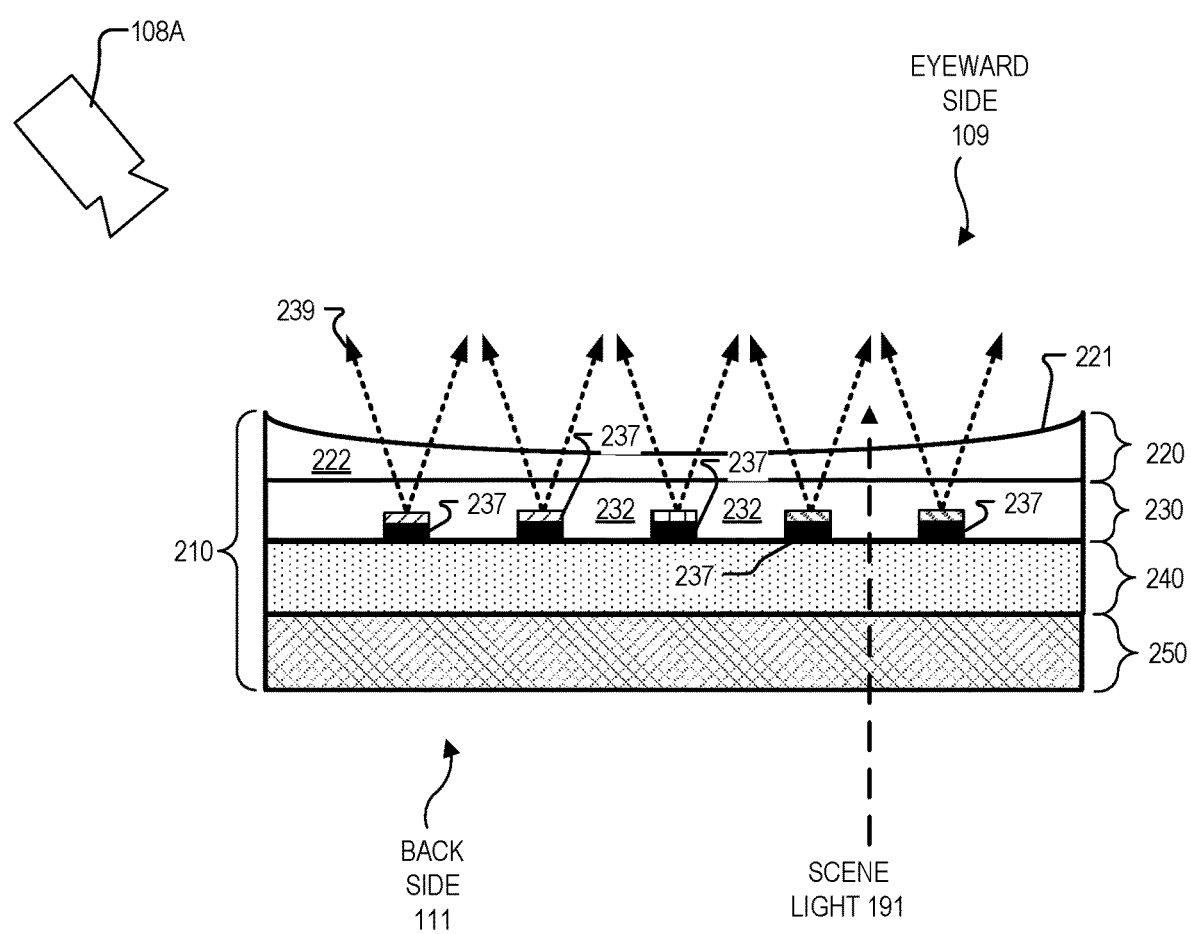
FIG. 2 illustrates an example eye-tracking system, in accordance with aspects of the present disclosure.

FIG. 2 illustrates an example eye-tracking system 200, in accordance with aspects of the present disclosure. The illustrated example of the eye-tracking system 200 is shown as including an eye-tracking camera 108A and a near-eye optical element 210. Near-eye optical element 210 is one possible example of near-eye optical element 110A and/or 110B of FIG. 1. The near-eye optical element 210 of FIG. 2 is shown as including a transparent layer 220, an illumination layer 230, an optical combiner layer 240, and a display layer 250. The in-field light sources 237 are configured to emit non-visible light 239 to an eyebox area 207 on the eyeward side 109 of the near-eye optical element 210 to illuminate eye 206. In some examples, the different in-field light sources 237 of illumination layer 230 may direct non-visible light 239 to eye 206 at different angles depending on the position of the in-field light sources 237 with respect to eye 206. For example, each in-field light sources 237 may include a respective beam-forming element that directs the non-visible light 239 to eye 206 at a different angle compared to other in-field light sources 237 included in the illumination layer 230. As described above, in-field light sources 237 may be VCSELs or SLEDs, and consequently non-visible light 239 may be narrow-band infrared illumination light (e.g. linewidth of 1-10 nm).

Illumination layer 230 may include a transparent material 232 that encapsulates the in-field light sources 237. Transparent material 232 and refractive material 222 may be configured to transmit visible light (e.g. 400 nm-700 nm) and near-infrared light (e.g. 700 nm-1.4 μm).

Figure 3:
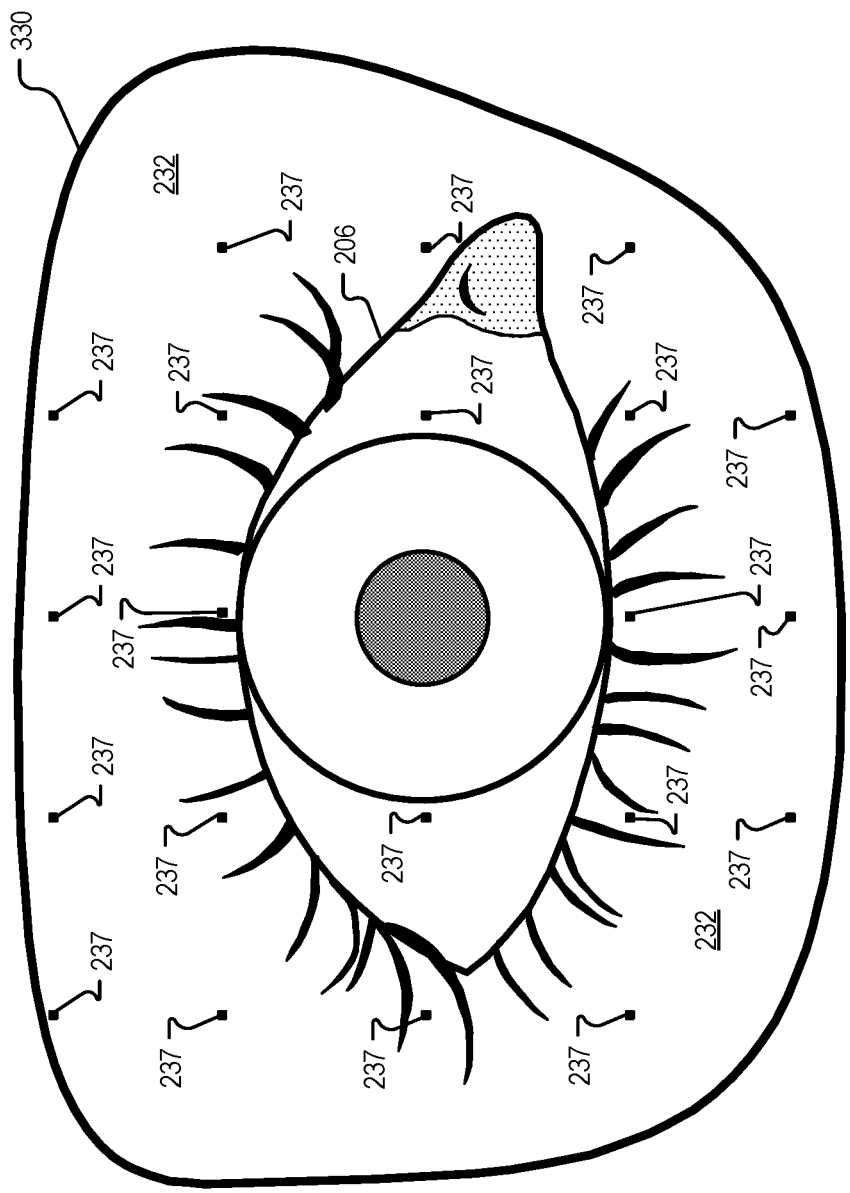
FIG. 3 illustrates a front view of an eye through an example illumination layer, in accordance with aspects of the present disclosure.

FIG. 3 illustrates a front view of eye 206 through example illumination layer 330, in accordance with aspects of the disclosure. In the illustrated embodiment, the in-field light sources 237 are arranged in a grid within a field-of-view of the eye 206. However, in other examples, the in-field light sources 237 may be arranged in a variety of patterns, such as a sparse pattern or concentric rings.

Figure 4:
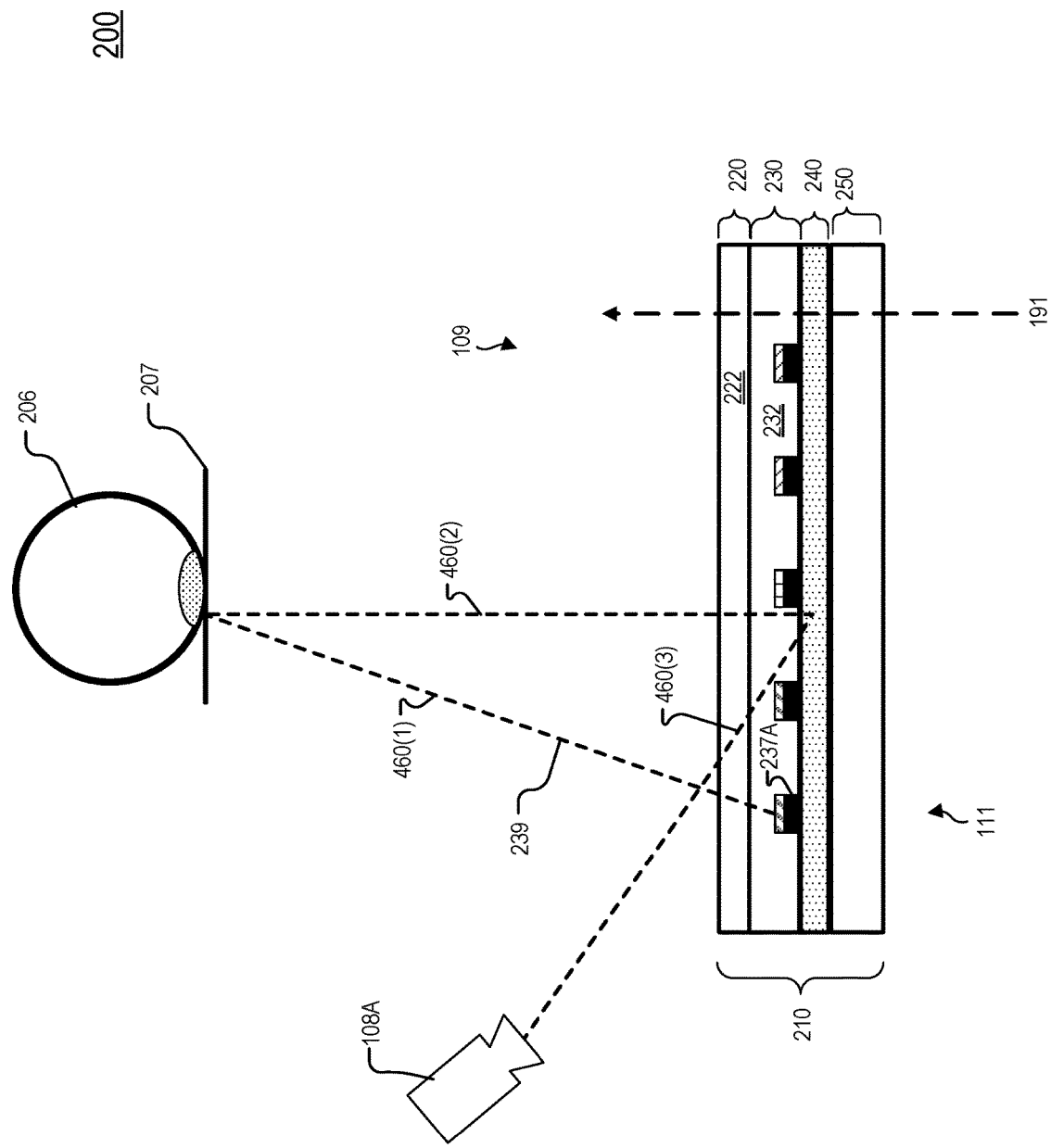
FIG. 4 illustrates an example optical path of reflected non-visible light, in accordance with aspects of the present disclosure.

FIG. 4 illustrates an example optical path 460 of non-visible light 239 for example eye-tracking system 200, in accordance with aspects of the present disclosure. As shown in FIG. 4, in-field light source 237A generates and then directs non-visible light 239 to the eyebox area 207 along optical path 460(1). FIG. 4 further illustrates the non-visible light 239 reflecting off the eye 206 and then returning to the near-eye optical element 210 along optical path 460(2). The reflected non-visible light then passes through the transparent layer 220, through the illumination layer 230, and then is incident on the optical combiner layer 240. As shown, the optical combiner layer 240 then directs the reflected non-visible light 239 to the eye-tracking camera 108A on the eyeward side 109 along optical path 460(3).

The eye-tracking camera 108A is configured to capture images of eye 206 for eye-tracking operations. In some examples, eye-tracking camera 108A includes a bandpass filter having a center wavelength corresponding to a wavelength of the non-visible light 239. Thus, the bandpass filter may pass the wavelength of the non-visible light 239 emitted by the in-field light sources and block other light from becoming incident on an image sensor of eye-tracking camera 108A. Eye-tracking camera 108A may include a complementary metal-oxide semiconductor (CMOS) image sensor.

FIG. 4 also shows that scene light 191 from the external environment may propagate through display layer 250, optical combiner layer 240, illumination layer 230, and transparent layer 220 to become incident on eye 206 so that a user can view the scene of an external environment.

As mentioned above, an optical combiner of an eye-tracking system (e.g., optical combiner layer 240) is configured to direct the non-visible light (e.g., by way of diffraction) to the eye-tracking camera 108A for imaging, which may induce both field-independent and field-dependent optical aberrations, which may distort the images captured by the eye-tracking camera 108A. Thus, eye-tracking camera 108A may include an optical assembly that is matched with the optical aberrations induced by an optical combiner to correct for these optical aberrations.

Figure 5A:
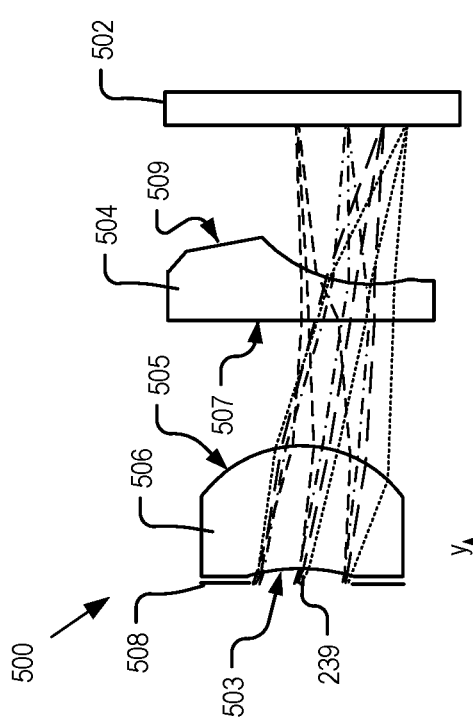
FIGS. 5A and 5B illustrate an example optical assembly of an eye-tracking camera, in accordance with aspects of the present disclosure.
Figure 5B:
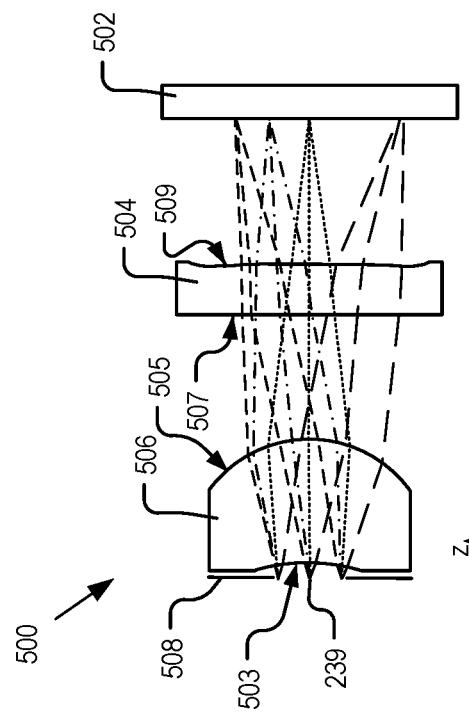

By way of example, FIGS. 5A and 5B illustrate an optical assembly 500 of an eye-tracking camera, in accordance with aspects of the present disclosure. FIGS. 5A and 5B illustrate example optical assembly 500 as including an aperture stop 508, a first lens 506, and a second lens 504. Also shown in FIGS. 5A and 5B is an image sensor 502. Optical assembly 500 and image sensor 502, together, are one possible implementation of the eye-tracking camera 108A of FIG. 1. Although, optical assembly 500 is shown as including only two lenses, in some embodiments, the optical assembly 500 may include any number of lenses, including two or more.

As shown in FIG. 5, the aperture stop 508 is configured to receive the non-visible light 239 from an optical combiner (e.g., optical combiner layer 240 of FIG. 2). The aperture stop 508 includes a hole or opening through which the non-visible light 239 travels and may be utilized within optical assembly 500 to control the cone angle, the depth of field, stray light, etc. In some embodiments, the aperture stop 508 may be an opaque label or sticker with a hole that is placed on or proximate to the first lens 506. In another example, the aperture stop 508 is an ink, a blackened aluminum, a copper black, or other coating that is applied to the first lens 506.

The first lens 506 is shown as being disposed on the optical path of the non-visible light 239 between the aperture stop 508 and the image sensor 502. In particular, the first lens 506 may be disposed between the aperture stop 508 and the second lens 504. The first lens 506 may be a plastic or a glass lens. As shown in FIG. 5A, the first lens 506 includes optical surfaces 503 and 505. One or both of the optical surfaces 503/505 are configured to correct for the field-independent optical aberrations (e.g., uniform astigmatic aberrations) that were induced by the optical combiner. One or more of the optical surfaces 503 and 505 may include a surface profile that is rotationally symmetric, freeform, aspherical, and/or anamorphic. For example, in one embodiment, optical surface 503 is an anamorphic optical surface and optical surface 503 is an aspherical optical surface.

As used herein, an aspherical optical surface is surface profile that is not a portion of a sphere or cylinder. In addition, an anamorphic optical surface is an optical surface that optically distorts the image (e.g., has different optical power in at least two directions). An optical surface may be considered "rotationally symmetric" if its imaging properties are unchanged by any rotation about some axis (e.g., rotated about the x-axis of FIG. 5A). A "freeform optical surface" may include an optical surface that has a minimum of bilateral symmetry and may have no plane of symmetry.

The second lens 504 is shown as being disposed on the optical path of the non-visible light 239 between the optical surfaces 503/505 of the first lens 506 and the image sensor 502. The second lens 504 may be a plastic or a glass lens. As shown in FIG. 5A, the second lens 504 includes optical surfaces 507 and 509. One or both of the optical surfaces 507/509 are configured to correct for the field-dependent optical aberrations (e.g., non-uniform astigmatic aberrations) that were induced by the optical combiner. One or more of the optical surfaces 507 and 509 may include a surface profile that is rotationally asymmetric, aspherical, and/or freeform. For example, in one embodiment, optical surface 507 is a Plano optical surface and optical surface 509 is a rotationally asymmetric freeform optical surface. In another embodiment, optical surface 507 is an aspherical optical surface.

As used herein, a freeform optical surface is surface profile that has no translational or rotational symmetry. In addition, a freeform optical surface may include a surface profile that may be described mathematically by one or more polynomials. In the illustrated example of FIG. 5A, the optical surface 509 is shown as freeform optical surface that is a Zernike-polynomial optical surface. However, optical surface 509 may be designed as other freeform optical surfaces including, an XY-polynomial optical surface, a Chebyshev polynomial optical surface, and the like. Alternatively, optical surface 509 may be an off-axis segment of an anamorphic optical surface. Optical surface 509 is configured to correct for the field-dependent aberrations induced by the particular optical combiner used in the eye-tracking system.

FIG. 5B illustrates an orthogonally-rotated-view (about the x-axis) of the optical assembly 500 of FIG. 5A. FIG. 5B illustrates the rotational asymmetry of the optical surface 509 about the x-axis.

In some examples, to reduce the size of the optical assembly 500, the optical surface 509 is disposed proximate to the image plane near the image sensor 502, where the footprints of the field points have separated from one another (e.g., as shown in the example of FIGS. 5A and 5B). However, in other examples, optical surface 509 may be disposed at a location well in front of the aperture stop 508 to perform the field-dependent corrections.

In some implementations, the first lens 506 includes a uniform diffractive element for correcting the chromatic aberration due to the dispersion from the optical combiner. The uniform diffractive element can be further extended to a freeform diffractive element pattern for higher order aberrations. Even still, the first lens 506 may include a freeform diffractive element for correcting monochromatic aberrations, assuming there is no chromatic aberration to correct. In this example, such a freeform diffractive element can take care of the non-rotationally symmetric aberrations and the rest of the system can be constructed with rotationally symmetric elements.

In addition, although FIGS. 5A and 5B are described above to include two optical surfaces 503/505 for providing the field-independent and field-dependent corrections, respectively, in other examples additional surfaces may be configured to provide focusing power and aberration correction. For example, as shown in FIGS. 5A and 5B, there is a rotationally symmetric surface that performs most of the focusing power of the lens assembly. However, the surface 507 on the second lens 504 could alternatively include a freeform surface to aid the other freeform surface (e.g., surface 509) in correcting field-dependent aberrations.

Figure 6:
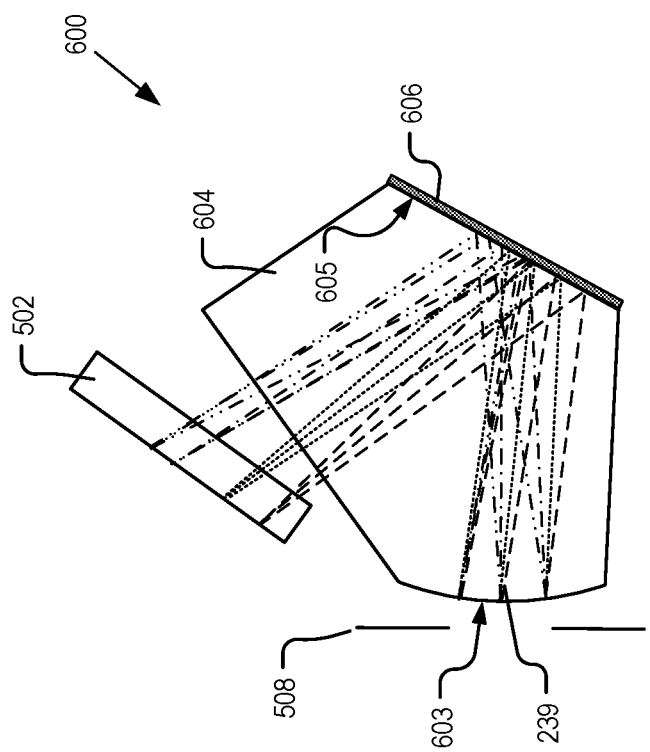
FIG. 6 illustrates another example optical assembly of an eye-tracking camera, in accordance with aspects of the present disclosure.

FIG. 6 illustrates another example optical assembly 600 of an eye-tracking camera, in accordance with aspects of the present disclosure. FIG. 6 illustrates example optical assembly 600 as including aperture stop 508 and a prism 604. Optical assembly 600 and image sensor 502, together, are one possible implementation of the eye-tracking camera 108A of FIG. 1. In some embodiments, optical assembly 600 may include one or more additional optical elements (e.g., lenses, filters, etc.) not explicitly shown in FIG. 6.

The prism 604 may be a single monolithic transparent material, such as plastic or glass that is disposed on the optical path of the non-visible light 239 between the aperture stop 508 and the image sensor 502. As shown in FIG. 6, the prism includes optical surfaces 603 and 605. One or both of the optical surfaces 603/605 are configured to correct for the field-dependent optical aberrations (e.g., non-uniform astigmatic aberrations) that were induced by the optical combiner. One or more of the optical surfaces 603 and 605 may include a surface profile that is rotationally asymmetric, aspherical, and/or freeform. For example, in one embodiment, optical surface 603 is an aspherical optical surface and optical surface 605 is a rotationally asymmetric freeform optical surface. In the illustrated example of FIG. 6, the optical surface 603 is configured to direct the non-visible light 239 to the optical surface 605 through refraction, whereas the optical surface 605 is configured to direct the non-visible light 239 to the image sensor 502 by way of reflection. Thus, in some examples, prism 604 may include a reflective coating 606 (e.g., metal) that is disposed on the optical surface 605.

Figure 8:
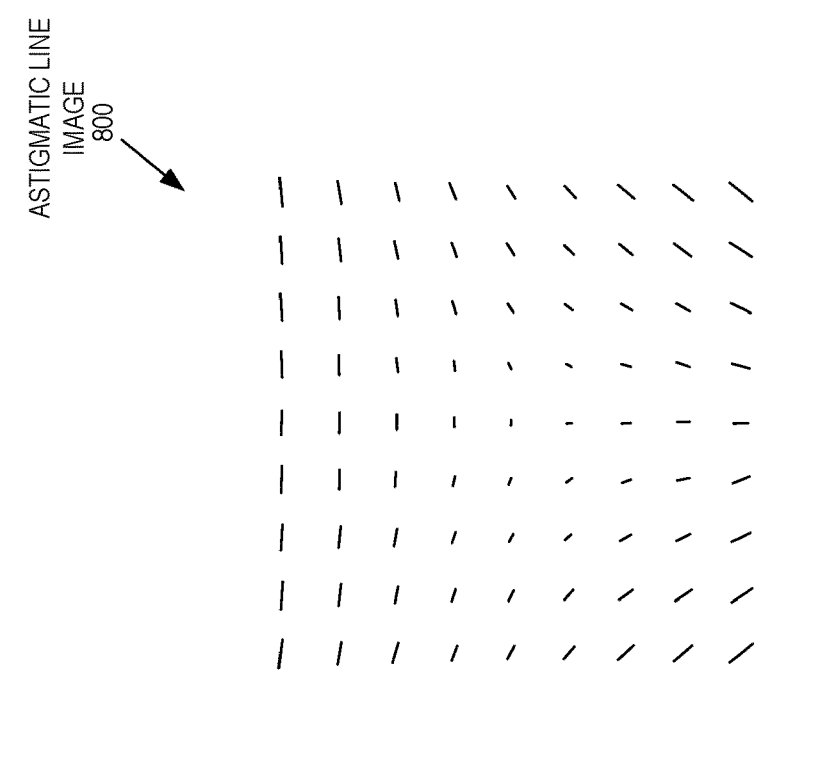
FIGS. 7 and 8 are example astigmatic line images illustrating optical aberrations that may be induced by an optical combiner, in accordance with aspects of the present disclosure.
Figure 7:
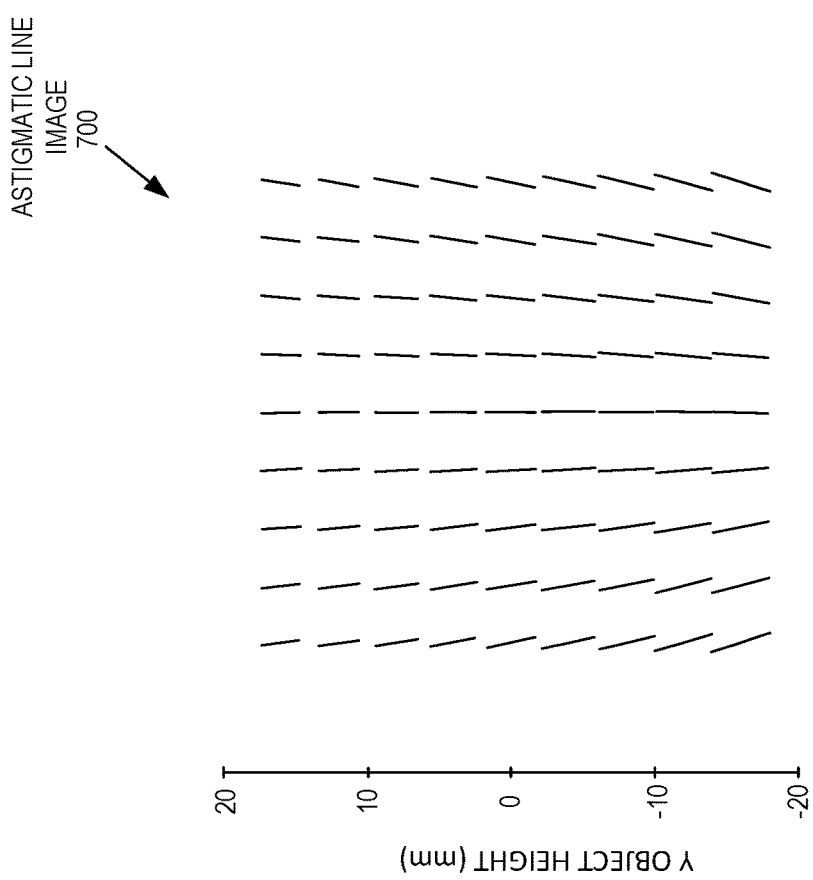

FIGS. 7 and 8 are example astigmatic line images 700/800 illustrating optical aberrations that may be induced by an optical combiner. As discussed above, an optical combiner, such as optical combiner layer 140A of FIG. 1, may induce both field-independent and field-dependent optical aberrations for imaging. One type of optical aberration includes astigmatic aberrations. FIGS. 7 and 8 illustrate example test images 700/800 of a set of uniformly distributed dots imaged via an optical combiner. That is, an "ideal" image would simply illustrate an array of dots. However, the optical combiner induces astigmatic aberrations which result in the dots being "stretched" along one or more of the x and y axes. Thus, the length of each of the lines illustrated in FIGS. 7 and 8 represents a magnitude of the astigmatic aberration induced at that field point, where a longer line represents a larger amount of astigmatic distortion.

FIG. 7 represents an astigmatic line image 700 obtained via an optical combiner with no optical aberration correction (e.g., non-visible light 239 received at the aperture stop 508 of optical assembly 500 of FIG. 5A). As shown, the astigmatic line image 700 illustrates a dominant astigmatic optical aberration generally along the y-axis. As further shown in FIG. 7, the astigmatic optical aberration along the y-axis is substantially uniform across the entire field-of-view, and thus is referred to herein as a field-independent optical aberration. Thus, a first optical surface of an optical assembly (e.g., optical surface 505 of FIG. 5A) may be configured to correct for these field-independent optical aberrations.

FIG. 8 represents an astigmatic line image 800 obtained after correction of the field-independent optical aberrations (e.g., the non-visible light 239 received at the second lens 504 of FIG. 5A). As shown in FIG. 8, some residual astigmatic distortion remains in the image. However, the remaining astigmatic optical aberrations in image 800 vary in both magnitude and in direction across the field-of-view, and thus may be referred to herein as field-dependent optical aberrations. Accordingly, the second optical surface of an optical assembly, such as optical surface 507 of FIG. 5A or optical surface 605 of FIG. 6, may be configured to correct for these field-dependent optical aberrations.

FIG. 9 illustrates an example eye-tracking camera 900, in accordance with aspects of the present disclosure. Eye-tracking camera 900 is one possible implementation of the eye-tracking camera 108A of FIG. 1. The illustrated example of eye-tracking camera 900 is shown as including a housing 902, a first lens 904, a second lens 906, an image sensor 908, and a printed circuit board (PCB) 910. The first lens 904 is shown as including a first optical surface 905, and the second lens 906 is shown as including a second optical surface 907. The first lens 904 and the second lens 906 may collectively be referred to herein as an optical assembly of the eye-tracking camera 900. Also shown in FIG. 9 is an optical axis 909 of the optical assembly of the eye-tracking camera 900, where an image plane of the image sensor 908 is normal to the optical axis 909.

In some embodiments, housing 902 is plastic or metal and is configured to house the first and second lenses 904/906 as well as the image sensor 908. In some examples, the housing 902 includes one or more registration features and/or spacers (not illustrated) which in turn provides the alignment (e.g., centration) and spacing (e.g., axial position) of the various optical components with respect to one another. The housing 902 may also be configured to block and/or absorb stray light. The illustrated example of housing 902 is also shown as providing an aperture stop by way of a hole 912. As shown in FIG. 9, the aperture stop is configured (e.g., aligned) to receive the non-visible light 239 from an optical combiner of an eye-tracking system.

In the illustrated example, the first and second lenses 904 and 906 are configured to direct the received non-visible light 239 to the image sensor 908 for imaging of an eye, where the first optical surface 905 is configured to correct for field-independent optical aberrations and the second optical surface 907 is configured to correct for field-dependent optical aberrations. As discussed above, the first and second optical surfaces 905/907 are configured to match with the specific optical aberrations induced by the particular optical combiner that is utilized to direct the non-visible light 239 to the eye-tracking camera 900. Furthermore, in some examples, a centerline 911 of image sensor 908 may be offset from the optical axis 909 to account for the angle (e.g., optical CANT) at which the eye-tracking camera 900 is positioned with respect to the optical combiner (e.g., see eye-tracking camera 108A of FIG. 1 with respect to optical combiner layer 140A).

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eye-tracking system, comprising:
   an eye-tracking camera that includes an image sensor; and
   an optical combiner configured to receive non-visible light reflected or scattered by an eye and to direct the non-visible light from a layer included in a stack of layers of a near-eye optical element to the eye-tracking camera, wherein the eye-tracking camera further comprises:
      an optical assembly for receiving the non-visible light from the optical combiner and to direct the non-visible light to the image sensor along an optical path, wherein the optical assembly includes:
      an aperture stop disposed on the optical path;
      a first optical surface disposed on the optical path, wherein the first optical surface is configured to correct for field-independent optical aberrations induced by the optical combiner; and
      a second optical surface disposed on the optical path, wherein the second optical surface is configured to correct for field-dependent optical aberrations induced by the optical combiner.

2. The eye-tracking system of claim 1, wherein the first optical surface includes a surface profile that is one or more of rotationally symmetric, aspherical, freeform, or anamorphic.

3. The eye-tracking system of claim 1, wherein the second optical surface is a freeform optical surface.

4. The eye-tracking system of claim 3, wherein the freeform optical surface is a Zernike-polynomial optical surface, an XY-polynomial optical surface, a Chebyshev-polynomial optical surface, or an off-axis segment of an anamorphic optical surface.

5. The eye-tracking system of claim 1, wherein the optical assembly further comprises:
   a first lens disposed on the optical path, wherein the first optical surface is a surface of the first lens; and
   a second lens disposed on the optical path, wherein the second optical surface is a surface of the second lens.

6. The eye-tracking system of claim 1, wherein the optical assembly further comprises a prism disposed on the optical path between the aperture stop and the image sensor, wherein the prism is configured to provide both the first optical surface and the second optical surface.

7. The eye-tracking system of claim 6, wherein the second optical surface is configured to reflect the non-visible light to the image sensor.

8. The eye-tracking system of claim 1, wherein the field-independent optical aberrations induced by the optical combiner include astigmatic aberrations that are substantially uniform across a field-of-view of the eye-tracking camera, and wherein the field-dependent optical aberrations induced by the optical combiner include astigmatic aberrations that vary across the field-of-view of the eye-tracking camera.

9. The eye-tracking system of claim 1, wherein the optical combiner comprises a diffractive optical element (DOE) or a volume hologram.

10. The eye-tracking system of claim 1, wherein the non-visible light comprises infrared or near-infrared light.

11. An eye-tracking camera, comprising:
    an image sensor configured to capture images; and
    an optical assembly for receiving non-visible light reflected or scattered by an eye and for directing the non-visible light to the image sensor along an optical path, the non-visible light received from an optical combiner included in a layer of a stack of layers of a near-eye optical element of an eye-tracking system, wherein the optical assembly includes:
       an aperture stop disposed on the optical path;
       a first optical surface disposed on the optical path proximate to the aperture stop, wherein the first optical surface is configured to correct for field-independent optical aberrations induced by the optical combiner; and
       a second optical surface disposed on the optical path, wherein the second optical surface is configured to correct for field-dependent optical aberrations induced by the optical combiner.

12. The eye-tracking camera of claim 11, wherein the optical assembly further comprises:
    a first lens disposed on the optical path, wherein the first optical surface is a rotationally symmetric, aspherical, and anamorphic surface of the first lens; and
    a second lens disposed on the optical path, wherein the second optical surface is a freeform optical surface of the second lens.

13. The eye-tracking camera of claim 11, wherein the optical assembly further comprises a prism disposed on the optical path between the aperture stop and the image sensor, wherein the prism is configured to provide both the first optical surface and the second optical surface.

14. The eye-tracking camera of claim 13, wherein the second optical surface is configured to reflect the non-visible light to the image sensor.

15. The eye-tracking camera of claim 11, wherein the field-independent optical aberrations induced by the optical combiner include astigmatic aberrations that are substantially uniform across a field-of-view of the eye-tracking camera, and wherein the field-dependent optical aberrations induced by the optical combiner include astigmatic aberrations that vary across the field-of-view of the eye-tracking camera.

16. The eye-tracking camera of claim 11, wherein the non-visible light comprises infrared or near-infrared light.

17. An optical assembly for an eye-tracking camera, the optical assembly comprising:
    an aperture stop for receiving non-visible light reflected by an eye, the non-visible light received from an optical combiner included in a layer of a stack of layers of a near-eye optical element of an eye-tracking system;
    a first optical surface disposed on an optical path between the aperture stop and an image sensor of the eye-tracking system, wherein the first optical surface is configured to correct for field-independent optical aberrations induced by the optical combiner; and
    a second optical surface disposed on the optical path between the first optical surface and the image sensor, wherein the second optical surface is configured to correct for field-dependent optical aberrations induced by the optical combiner.

18. The optical assembly of claim 17, further comprising:
a first lens disposed on the optical path between the aperture stop and the second optical surface, wherein the first optical surface is a rotationally symmetric, aspherical, and anamorphic surface of the first lens; and
a second lens to be disposed on the optical path between the first lens and the image sensor, wherein the second optical surface is a freeform optical surface of the second lens.

19. The optical assembly of claim 17, further comprising:
a prism to be disposed on the optical path between the aperture stop and the image sensor, wherein the prism is configured to provide the first optical surface and the second optical surface, and wherein the second optical surface is configured to reflect the non-visible light to the image sensor.

20. The optical assembly of claim 17, wherein the field-independent optical aberrations induced by the optical combiner include astigmatic aberrations that are substantially uniform across a field-of-view of the eye-tracking camera, and wherein the field-dependent optical aberrations induced by the optical combiner include astigmatic aberrations that vary across the field-of-view of the eye-tracking camera.

* * * * *